United States Patent Office 3,085,120
Patented Apr. 9, 1963

3,085,120
PREPARATION OF ALLYLIC METAL COMPOUNDS
Dietmar Seyferth, Arlington, Mass., and Michael A. Weiner, Brooklyn, N.Y., assignors to Ethyl Corporation, New York, N.Y., a corporation of Virginia
No Drawing. Filed Aug. 10, 1959, Ser. No. 832,461
7 Claims. (Cl. 260—665)

The present invention is concerned with the preparation of allylic metal compounds, especially those of the alkali metals.

There has been little work directed toward the preparation of the allylic alkali metal compounds. A procedure that has been employed heretofore is the reaction of lithium metal with allyl magnesium bromide in diethyl ether. The procedure suffers particular inherent disadvantages. For example, the resulting solution is contaminated with allyl magnesium bromide, allyl bromide, biallyl, and lithium. Thus, it is difficult to separate the by-products from the reaction mixture. Further, the yields are low and the coupling reaction forming biallyl is undesirable.

The allylic alkali metal compounds are quite useful, as will be described in more detail hereinafter. Accordingly, it is desirable to provide an improved method for the production of the allylic alkali metal compounds.

An object of the present invention is to provide a new and novel process for the preparation of allylic metal compounds, particularly those of the alkali metals. A further object is to provide such compounds in higher yield and purity than heretofore available. A specific object is to provide a novel process for the preparation of allyllithium. These and other objects will be evident as the discussion proceeds.

It has now been found that allylic alkali metal compounds can be produced by reacting an organo alkali metal compound with an allylic compound of a metal having an electromotive potential lower than that of the alkali metals. Of the organo alkali metal compounds, those wherein the organo groups are aromatic groups having up to and including about 8 carbon atoms are preferred, especially phenyllithium. Best results are also obtained when the allylic metal reactant is one of the metals of group IV-A of the periodic chart of the elements, particularly lead and tin. Allyltriphenyltin and allyltriphenyllead comprise especially preferred embodiments of this reactant. Additional advantage is achieved when either the allylic alkali metal product or the by-product metal compound is insoluble in the reaction system. Therefore, solvents can be employed to advantage for this and other purposes, particularly the aliphatic monoethers such as diethyl ether and similar alkyl ethers having up to about 8 carbon atoms in the hydrocarbon groups. Although a wide range of temperatures are applicable in conducting the process, it is preferable to employ a temperature between 0 to 70° C. Thus, a particularly preferred embodiment of the present invention is the reaction of phenyllithium with allyltriphenyltin or allyltriphenyllead in a monoether, especially diethyl ether, at a temperature between 0 to 70° C., preferably about room temperature.

The process is of particular advantage in that the allylic alkali metal compounds are obtained in high yield by a simple and clear-cut reaction. The reaction proceeds to completion and is not complicated by reversibility. Still further, the allylic metal compound is produced in a high state of purity and is readily recoverable from the reaction mixture. Other advantages will be evident as the discussion proceeds.

The alkali metal reactant compounds are, in general, organic compounds of the alkali metals. The alkali metals include the metals of group I-A of the periodic chart of the elements, e.g. lithium, sodium, potassium, rubidium, and cesium. The organo groups are, of course, different from those of the allylic metal reactant. Thus, they will include aliphatic, alicyclic and heterocyclic radicals all of which are free of beta-unsaturation, i.e., the beta carbon to which the alkali metal is bonded will be a saturated carbon atom; and aromatic radicals. Typical examples of such materials include ethyllithium, butyllithium, octyllithium, octadecyllithium, cyclohexyllithium, cyclopentadienyllithium, cyclopentyllithium, phenyllithium, benzyllithium, naphthyllithium, and the like including isomers thereof and such compounds wherein sodium, potassium, rubidium and cesium are substituted for lithium. It is to be understood that the hydrocarbon groups can be further substituted with other functional groups provided such are essentially inert in the reaction. The organo alkali metal compound will, in general, preferably contain up to about 20 or more carbon atoms in each of the aforementioned organo radicals. It is preferred, however, to employ organo alkali metal compounds wherin the organo groups are hydrocarbon having up to and including about 8 carbon atoms, especially aromatic radicals. Likewise, of the alkali metals, lithium and sodium are preferred, especially lithium.

The allylic metal reactant is a stable allylic compound of a metal lower in the electromotive series of the elements than are the alkali metals. In general, such compounds contain at least one allylic group and the remaining substituents attached to the metal are the same or different organic radicals or other ligands, such as the halides. Included among such allylic metal compounds are, for example, allylmagnesium bromide, chloride, iodide, and fluoride; diallylmercury, allyltriphenylsilane, allyltriphenyltin, tetraallyltin, allyltributyltin, allyltrioctyltin, butenyl-2-tribenzyltin, diallyldiphenyltin, dioctyl-di(3-methylbutenyl-2)tin, 3-phenylallyltriphenyltin, allyltricyclohexylin, allyltricyclohexenyltin, triallylphenyltin, allyltriphenyllead, and the like compounds wherein all radicals other than the allylic radicals preferably contain less than about 8 carbon atoms and are of the character described above in connection with the organo alkali metal compounds. As indicated in the above illustrative examples, the allyl group can be further substituted with organic radicals, preferably hydrocarbon containing up to about 8 carbon atoms, of the character described hereinbefore with regard to the organo alkali metal compounds. Similar examples of such compounds of other metals and metalloids of the group II through V-A elements of the periodic chart of the elements, as set forth in the Handbook of Chemistry, Lange, 8th ed. at pages 56 and 57, will be evident. It is preferable that the allylic metal reactant employed be one which forms a by-product organometallic compound which is insoluble in the reaction system. Likewise, it is preferable that the metal be a group IV-A metal, especially tin or lead, and have only one allylic group attached thereto with the remaining valences of the metal being satisfied by alkyl and aryl hydrocarbon radicals containing up to about 8 carbon atoms. Best results and a more economical process are obtained when such preferred compounds are employed. Allyltriphenyltin, allyltriphenyllead, allyltributyltin, and allyltributyllead comprise particularly preferred allylic metal reactants.

The allylic metal reactants employed in the process of this invention are usually prepared in either of two ways. One method for making magnesium compounds comprises reacting magnesium metal with an allylic halide. The other more general method involves the reaction of allylic magnesium halide in ether solution with a metal halide. For example, allyl magnesium bromide can be prepared by reacting magnesium with allyl bromide in ether, and allyltriphenyltin is prepared by reacting allyl magnesium bromide with triphenyltin chloride in ether. It is to be understood, however, that other methods can be employed for forming the allylic metal reactant.

Example I

Employing a reactor equipped with internal agitation, external heating means, and a means for maintaining a nitrogen atmosphere during the course of the reaction, 0.077 mol of triphenylallyltin in 107 parts of diethyl ether were added thereto. Then 50 parts of a solution of phenyllithium in diethyl ether containing 0.084 mol of phenyllithium were added to the reactor and the mixture stirred under nitrogen for 30 minutes. A precipitate immediately formed and an essentially quantitative yield of allyllithium in diethyl ether solution was obtained based upon the amount of tetraphenyltin by-product collected upon filtration.

Example II

Employing the procedure of Example I, 0.098 mol of allyltributyltin were reacted with 0.098 mol of phenyllithium in diethyl ether for one hour. The yield of allyllithium produced was 78 percent based upon the amount of phenyltributyltin by-product which was recovered.

Example III

Employing the procedure of Example I, methallyllithium was produced in high yield when essentially equimolar amounts of methallyltriphenyltin and phenyllithium were reacted.

Example IV

Equally satisfactory results are obtained when Example I is repeated substituting phenylsodium or phenylpotassium for phenyllithium employing a reaction temperature of 0° C. to produce allylsodium or allylpotassium precipitated along with the tetraphenyltin.

Example V

Example I is repeated employing an equivalent amount of allyltriphenyllead in place of the allyltriphenyltin. Allyllithium is produced in high yield.

Example VI

Example I is repeated with exception that ethyllithium is substituted for phenyllithium and the reaction is conducted at the reflux temperature for one hour. Allyllithium is produced in high yield.

When this example is repeated using octyllithium, cyclohexyllithium, or benzyllithium in place of ethyllithium, equally satisfactory production of allyllithium is obtained.

Example VII

When 1 mol of naphthyllithium is reacted with 1 mol of allyl magnesium bromide in diethyl ether at the reflux temperature for one hour, allyllithium is obtained.

Example VIII

Allyllithium is obtained in good yield when phenyltriallyltin is reacted with benzyllithium at 70° C. for 2 hours using nonane as a solvent.

Example IX

When 2 mols of cyclohexyllithium are reacted with 1 mol of diallylmurcury in triethylamine at 60° C. for 2 hours, allyllithium is obtained.

Example X

When 4 mols of amylsodium are reacted with essentially 1 mol of tetraallyltin employing tetrahydrofuran as a solvent at a temperature of 20° C. for 1 hour, allylsodium is precipitated from the reaction mixture.

Example XI

Phenylallyllithium is obtained in high yield when Example I is repeated substituting 3-phenylallyltriphenyltin for allyltriphenyltin.

Example XII

Allyllithium is obtained when phenyllithium is reacted with allyltriphenyllead in essentially equimolar amounts employing petroleum ether as a solvent at room temperature for 4 hours.

It is not intended that the present invention be restricted to or limited by the above presented examples. Such are provided merely as illustrations and it will be evident that other alkali metals such as rubidium and cesium can be employed in place of lithium, sodium, and potassium, and other organo groups can be employed in place of those illustrated in the examples. Similarly, equally satisfactory results are obtained when one substitutes other allylic metal reactants described hereinbefore in place of those presented in the above examples.

Generally, temperatures up to the decomposition temperature of the reactants or products are employable. For simplification in processing, reflux temperature or lower is employed in order to avoid the necessity of pressure operation. When temperatures much above about 100° C. are used some side reactions may occur as, for example, ether cleavage when an ether is employed as a diluent. Therefore, in a preferred operation the temperature is generally between about 0 to 70° C. with pressure being used where necessary to maintain a liquid system or reflux temperature being employed when the system will boil at a temperature below 70° C. Room temperature, e.g. 25° C., and lower is particularly advantageous to avoid side reactions and give high yields. As indicated there is no necessity for pressure operation but such can be employed particularly when temperatures above the boiling point of the reaction mixture are used.

Since the reactants and products are generally highly reactive to the atmosphere, it is desirable to conduct the reaction in an essentially inert atmosphere. For this purpose, such inert gases as nitrogen, argon, neon, krypton, and xenon are employable preferably pre-dried.

The reaction is essentially instantaneous so that relatively short periods of reaction are required. Generally speaking, times longer than about five hours are not needed and reaction periods of less than about one hour are preferred.

Diluents or solvents are not essential to the process but can be used to particular advantage, as for example heat distribution and solvation. They are particularly useful in order to result in a system whereby the product allylic alkali metal compound or the by-product organometallic compound, preferably the latter, is to be precipitated from the reaction system. The organic solvents which are essentially inert under the reaction conditions and liquid are applicable. For such purpose the hydrocarbons, ethers, and tertiary amines have been found most suitable. Among the hydrocarbons are included both aliphatic and aromatic materials as for example the hexanes, octanes, nonanes, cyclohexanes, benzene, toluene, xylene, tetralin, and the like. The ethers include for example diethyl ether, diamyl ether, dioctyl ether, methylamyl ether, diphenyl ether, dibenzyl ether, cyclic ethers, such as dioxane, tetrahydrofuran and the polyethers as for example the dimethyl, diethyl, dibutyl, and the like ethers of ethylene glycol, diethylene glycol, triethylene glycol, and tetraethylene glycol. Included among the tertiary amines are, for example, trimethyl amine, triethyl amine, tri-n-butyl amine, triphenyl amine, dimethyl aniline, N-methyl piperidine, N-ethylmorpholine, and the like. While many of the ethers and amines complex with certain reactants and products, this does not hinder their use. Thus, the aforementioned solvents and others can be substituted in the above examples with equally satisfactory results. The solvents which are liquid under the reaction conditions and in which the by-product organometallic compound is insoluble are particularly preferred since precipitation of the by-product enhances the rate of reaction and leaves the desired allylic alkali metal product in solution ready for use. When the allylic alkali metal product is one which is insoluble in most of the above type solvents, it is desirable that the solvent be such that would solvate the by-product organometallic compound. Thus, this particular type of allylic alkali metal compound, e.g., allylsodium will be precipitated from the reaction system and is easily recovered by filtration. For best results in connection with fast reaction and easy recovery of the product allylic alkali metal compound either in solution or as a precipitate in accordance with the above discussion, the ethers, particularly the simple or monoethers, e.g. diethyl ether, having up to about 8 carbon atoms are preferred. This is especially the case when a lithium compound is desired. When a product of alkali metals other than lithium, e.g. sodium, is desired an ether can be employed at lower temperature, e.g. below about 30° C., but liquid hydrocarbons are preferred at higher temperatures.

In conducting the process an excess of either reactant can be employed. If an excess is employed, it is preferable that the allylic metal reactant be in excess. However, in order to simplify recovery of the desired allylic alkali metal compound and to achieve best results, it is preferable to use essentially stoichiometric amounts of the organo alkali metal compound and the allylic metal compound with which it is reacted. The amount of solvent, when such is employed, is generally sufficient to provide fluidity of the reaction system. Thus, amounts as high as 100 parts by weight of solvent per part by weight of the organo alkali metal reactant employed, and higher, can be used. In the preferred embodiments of this invention wherein either the allylic alkali metal product or the by-product organometallic compound, preferably only the latter, is insoluble in the reaction system, it is advantageous to employ at least sufficient solvent to solvate essentially all of the allylic alkali metal product under the conditions of reaction and separation of the product from the by-product. Another criterion of the preferable quantity and the choice of the solvent to be employed is that it is preferably one which will precipitate the by-product organometallic compound but will solvate the reactants and allylic alkali metal product, particularly the allyllithium product.

The process of this invention provides products which are of considerable utility. They are particularly useful as intermediates for forming other compounds. For example, when Example I is repeated essentially as described and then an essentially stoichiometric amount of 4-methyl-2-pentanone is added to the mixture with refluxing for 1½ hours, 4,6-dimethyl-1-hepten-4-ol is produced in high yield. The products are generally applicable in beta-ionone condensation reactions of the type described in U.S. Patent 2,734,091. Likewise, when the product of the reaction of 0.17 mol of phenyllithium with 0.153 mols of triphenylallyltin was added to a slurry of Dry Ice in diethyl ether and the resulting mixture hydrolyzed with sulfuric acid, filtered, and the ether layers distilled, vinylacetic acid was obtained in high yield. Additionally, when allyllithium was produced according to the procedure of Example I and then reacted with triphenylgermanium bromide, allyltriphenylgermane was obtained in high yield. The analogous uses of other products obtained by the process will be evident. Another use of the products produced according to the invention is as a catalyst or in catalyst formulations to be employed in the polymerization of olefins, particularly ethylene, propylene, isoprene, isobutene, and copolymers thereof. For example, allyllithium or allyllithium in combination with an equivalent amount of group IV–B, V–B, or VI–B metal halides, especially the titanium tetra- and trichlorides, can be used as catalysts for the polymerization of ethylene at temperatures between 0 and 250° C. and pressures between 100 to 500° p.s.i. The polyethylene so formed has physical and chemical properties that are superior in a number of respects to those of conventionally prepared polyethylene. The same superiority subsists in the other polymers made using, as catalysts or in catalyst formulations, the products of the process of this invention. These and other uses of the products produced will now be evident to those skilled in the art.

Having thus described the process of this invention, it is not intended that it be limited except as set forth in the following claims.

We claim:

1. The process which comprises reacting in an inert atmosphere an organo alkali metal compound with an allylic compound of a group IV–A metal having an electromotive potential lower than that of the alkali metal.

2. A process for the production of allyllithium which comprises reacting in an inert atmosphere triphenylallyltin with phenyllithium at a temperature between about 0 to 70° C. in the presence of an ether solvent.

3. The process of claim 2 wherein diethyl ether is the solvent employed.

4. A process for the production of allyllithium which comprises reacting in an inert atmosphere allyltriphenyllead with phenyllithium at a temperature between about 0° to 70° C. in the presence of an ether solvent.

5. The process of claim 4 further defined wherein diethyl ether is the solvent employed.

6. The process of claim 1 further defined wherein the organo alkali metal compound is an aromatic alkali metal compound in which the aromatic groups have up to and including about 8 carbon atoms and the allylic compound is an allyl triaryl compound, wherein each aryl group contains up to about 8 carbon atoms, of a group IV–A metal having an electromotive potential lower than that of the alkali metal.

7. The process of claim 6 further defined wherein the reaction is conducted at a temperature between about 0° to 70° C. in the presence of an ether solvent.

References Cited in the file of this patent

UNITED STATES PATENTS 2,815,388    Inhoffen et al. _____ Dec. 3, 1957

OTHER REFERENCES

Jones et al.: "Methods of Preparation of Organometallic Compounds," Chem. Reviews, vol. 54, October 1954, pp. 863–865.

Coates: "Organometallic Comopunds," p. 6 (1957), published by John Wiley & Sons, Inc., New York, N.Y.